(12) United States Patent
Anwar et al.

(10) Patent No.: US 8,090,935 B2
(45) Date of Patent: Jan. 3, 2012

(54) DIRECT REGISTER ACCESS FOR HOST SIMULATION

(75) Inventors: Zeeshan Anwar, Punjab (PK); Jukka-Pekka Ikaheimonen, Oulu (FI)

(73) Assignee: Mentor Graphics Corporation, Wilsonville, OR (US)

( * ) Notice: Subject to any disclaimer, the term of this patent is extended or adjusted under 35 U.S.C. 154(b) by 373 days.

(21) Appl. No.: 12/353,856

(22) Filed: Jan. 14, 2009

(65) Prior Publication Data

US 2009/0193241 A1 Jul. 30, 2009

Related U.S. Application Data

(60) Provisional application No. 61/023,415, filed on Jan. 24, 2008.

(51) Int. Cl.
*G06F 11/36* (2006.01)
(52) U.S. Cl. ........................................... 712/244
(58) Field of Classification Search .................. None
See application file for complete search history.

(56) References Cited

U.S. PATENT DOCUMENTS

| | | | | |
|---|---|---|---|---|
| 5,829,012 A * | 10/1998 | Marlan et al. | ................ | 711/102 |
| 6,079,015 A * | 6/2000 | Harwood et al. | ............ | 712/244 |
| 6,163,490 A * | 12/2000 | Shaffer et al. | ................ | 365/200 |
| 7,065,694 B2 * | 6/2006 | Luick | ............................ | 714/747 |
| 7,493,483 B2 * | 2/2009 | McIntosh | ......................... | 713/2 |
| 2004/0034825 A1 * | 2/2004 | Jeddeloh | ....................... | 714/733 |
| 2004/0187117 A1 * | 9/2004 | Orion et al. | ................... | 718/100 |
| 2006/0174163 A1 * | 8/2006 | Gravoille et al. | ............. | 714/38 |
| 2007/0011431 A1 * | 1/2007 | Hogdal et al. | ................ | 711/207 |

* cited by examiner

*Primary Examiner* — Eric Coleman

(57) ABSTRACT

Methods and apparatuses are provided that enable software designed to be operated with an embedded system to be tested in the absence of a physical embodiment of the embedded system. A simulation of the embedded system may be employed to operate the software. Various implementations of the invention provide for the processing of requests by the software to access memory within the embedded system. Still, various implementations of the invention provide for the identification of these memory access request and for the mapping of the desired memory location to a valid memory location.

27 Claims, 8 Drawing Sheets

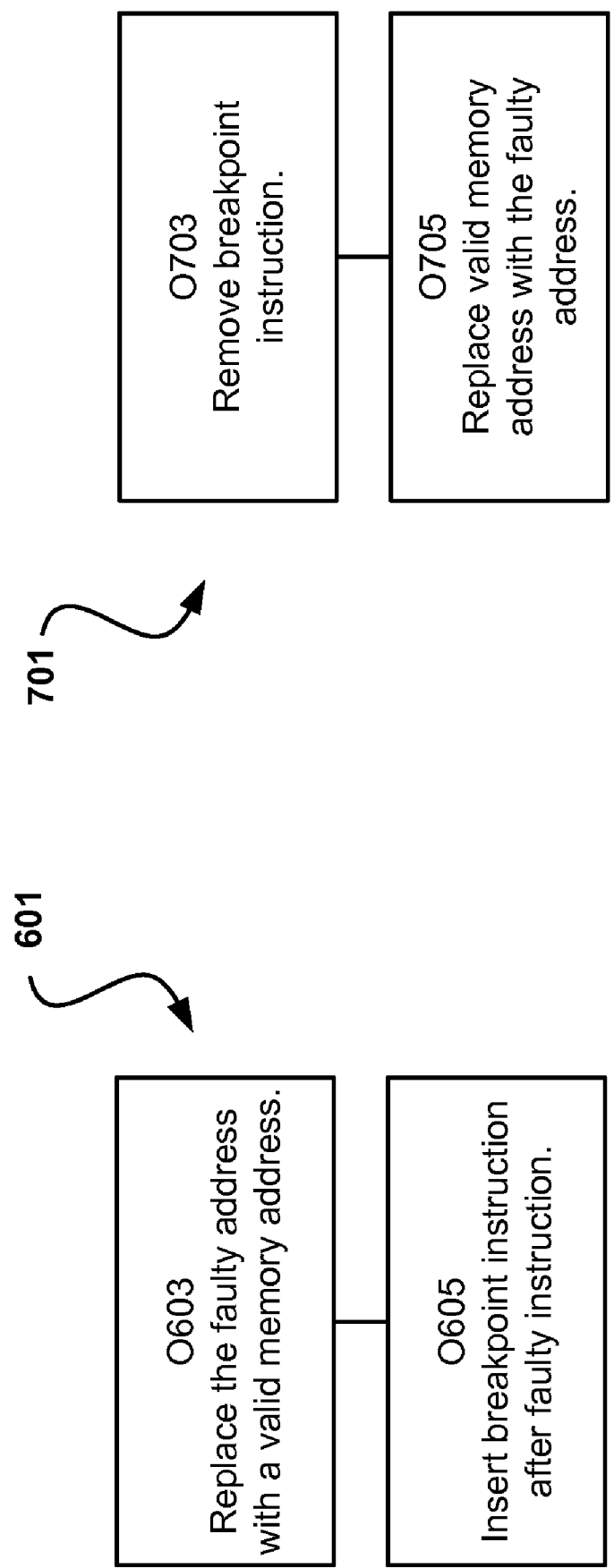

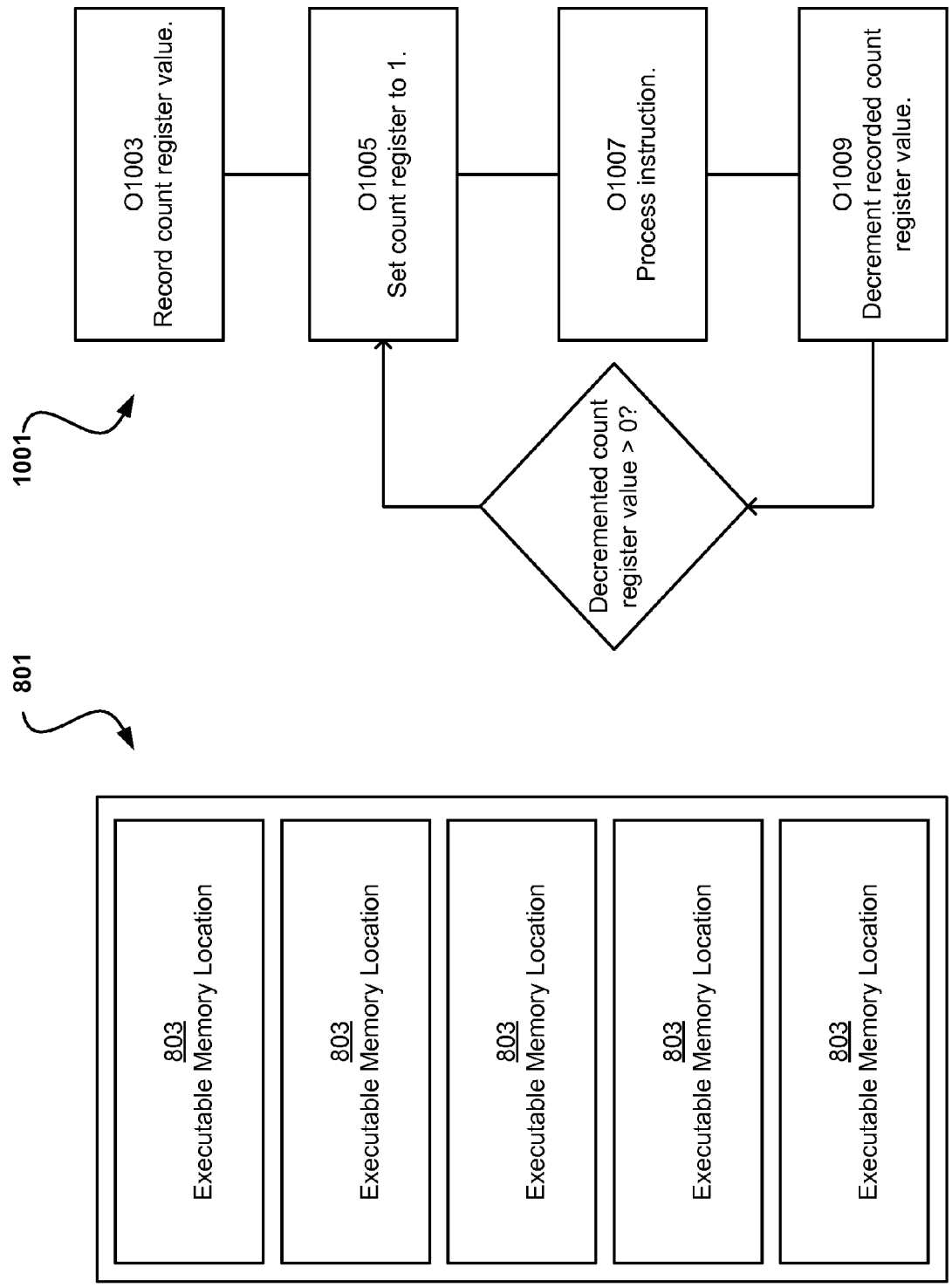

DIRECT REGISTER ACCESS FOR HOST SIMULATION

RELATED APPLICATIONS

This application claims priority under 35 U.S.C. §119(e) to U.S. Provisional Patent Application No. 61/023,415 entitled "Implicit Memory Access Systems For Host Simulations," filed on Jan. 24 2008, and naming Anwar Zeeshan et al. as inventors, which application is incorporated entirely herein by reference.

FIELD OF THE INVENTION

The invention relates to the field of embedded system development. More specifically, various embodiments of the invention relate to memory access in a host simulation environment.

BACKGROUND OF THE INVENTION

Embedded Systems

In general, an embedded system may be described as a special purpose computing system designed to perform one or a few dedicated functions. Embedded systems are commonly used in consumer devices like personal digital assistants, mobile phones, videogame consoles, microwaves, washing machines, alarm systems, and digital cameras. In addition to the consumer space, embedded systems are used in nearly every industry, from telecommunications to manufacturing, and from transportation to medical devices. In fact, embedded systems are so commonly in use today that it is not feasible to exhaustively list specific examples.

The term "embedded system" does not have a precise definition, and determining what is and is not an embedded system can be difficult. For example, a general purpose computer, such as a laptop, is not typically characterized as an embedded system. However, a laptop is usually composed of a multitude of subsystems such as the hard disk drive, the motherboard, the optical drive, the video processing unit, and various communication devices. Many of the individual subsystems comprising the laptop may themselves be embedded systems.

The complexity of embedded systems varies from those with a single microcontroller chip and a light emitting diode to those with multiple microprocessor units and various peripheral communication interfaces and mechanical parts. Additionally, embedded systems range from those having no user interface at all to those with full user interfaces similar to a desktop operating system. Manufacturers of modern microprocessors are increasingly adding components and peripheral modules to their microprocessors, creating what may be thought of as embedded processors. This type of embedded system is often referred to as a system on a chip (SoC). A simple example of a system on chip is an application-specific integrated circuit (ASIC) packaged with a universal serial bus (USB) port.

There are many advantages to using embedded systems. For example, typically, an embedded system is designed to do some specific task, as opposed to being a general purpose computer with a wide range of programming and performance features for performing many different tasks. One benefit to using embedded systems as opposed to general computing devices stems from the fact that embedded systems are dedicated to specific tasks. As a result, design engineers can optimize the embedded system for the desired task, which assists in reducing the size and cost of the device as well as increasing its reliability and performance. Furthermore, functionalities can be designed into an embedded system that would not be feasible using hardware alone. By using software to accomplish some of the functionality that would have been accomplished in hardware, designers may specify and define certain functionality later in the design cycle than was previously possible. An additional advantage is that embedded system designs can often be reconfigured for different functionality with less engineering overhead than a design done strictly in hardware can. As a result, design reuse increases and time to market is lowered.

The software written for embedded systems is generally referred to as "firmware." Thus, the program used to control the hardware of an embedded system is referred to hereafter interchangeably as either software or firmware. Firmware is often stored on read only memory (ROM) based storage devices. For example, flash-based read only memory or electronically erasable read only memory (EEPROM) devices are often used to store firmware. The firmware controls the various features, functioning, and interfaces of the embedded system. Thus, a digital video disk player will have firmware that processes the appropriate response to an input such as the user pressing the "power" button or the "play" button. Additionally, the firmware in this example would control the storage mechanism and the digital processing circuitry to decode and output onto the appropriate ports the video and audio signals stored on the video storage medium.

A further advantage of embedded systems is the ability to update the firmware, which provides longer term support and flexibility, a benefit often not possible with purely hardware based systems. Updating an embedded systems firmware is often referred to as "flashing" the device. For example, manufacturers of most modern digital video disk players typically provide a means for the firmware stored on the device to be erased and a new version stored in place of the erased firmware. As stated, a primary function of allowing the firmware to be updated is to prolong the usable life of the embedded system. For example, the firmware of a digital video disk player could be updated to support new video encoding specifications. The new firmware file may be retrieved from an optical disk or other data storage medium, retrieved via connecting the device to a general purpose computer, or directly from the Internet via an Ethernet port.

Embedded System Development

Although packaging software and hardware together to create an embedded system provides for great flexibility and increased functionality, it also complicates the design. The development of an embedded system requires knowledge of software and hardware design. Additionally, an embedded system development engineer will need to use tools to design and then test the electrical, mechanical, and software components of the design. Not only must the individual components be designed and tested, but the combination or interaction of the electrical, mechanical, and software components must be tested together to ensure proper functionality. Furthermore, complex devices require significantly more complex firmware to operate than do simple devices. As a result, the knowledge and skill required to design an embedded system and program its firmware increases as the complexity of the design increases.

The design of an embedded system is further complicated by the fact that, in many instances, the hardware and software are developed concurrently. This prevents the verification engineers from using an actual embodiment of the designs hardware as the target with which to test the software on. In the absence of an actual embodiment of the hardware as a test target, special design and verification tools are needed to test the software. One solution available to the embedded system engineer is to test the software with a simulation of the hardware. The simulation could be a behavioral software simulation of the design, or it could be a hardware emulator configured to mimic the design. It is often possible with modern tools to simulate the hardware and test the software with the same general purpose computing device (e.g., a computer workstation.) Using a simulation of the hardware as the target with which to test the software component of the design is often called host simulation. Embedded system developers frequently employ host simulation due to the fact that in a host simulation environment, testing methods, as well as hardware and software design changes, can be quickly developed and executed.

Employing host simulation in the test methodology may provide a decrease in design time and allow the hardware and software to be developed and tested concurrently. However, even using advanced host simulation tools, it is typically not possible to test the entirety of a software package using host simulation. Embedded software typically contains portions referred to as the "device layer" or "device driver." These portions of the software are hardware dependent. More particularly, the device layer portions contain specific references to the actual hardware within the design, such as memory storage location addresses, such as the memory storage location address associated with a particular data storage register. Execution of device layer code in a host simulation environment will often trigger a memory access exception. More particularly, when a specific instruction within the firmware specifies that data from a particular memory storage location address be read and that particular address has not been explicitly allocated by the host simulation environment, a memory access exception will result.

This limitation in host simulation is commonly overcome by replacing the device driver sections of the software with direct function calls to the hardware simulator component of the host simulation environment. Although this method typically overcomes the limitation, it requires the developer to maintain two copies of the software. More particularly, one version of the software must be maintained to test using host simulation and one version of the software that runs on the actual hardware must be maintained. Maintaining two copies of the software creates extra work for the developer and adds a significant amount of overhead. Additionally, maintaining two copies of the software provides more opportunity and possibility to introduce errors into the software.

Another method of testing hardware-specific software in a host simulation environment is to allocate a memory array to simulate the memory-mapped hardware. The hardware memory accesses can be redirected to this simulated memory array either by changing the hardware addresses in the code itself or by using linker options. One advantage to employing a simulated memory array is that it allows for host simulation to be implemented while requiring that few, if any, changes be made to the software. However, implementing host simulation with a simulated memory array also has some basic limitations. For example, when a memory mapped hardware element is accessed for a read or a write operation, the action taken by the embedded systems hardware in response to this memory access is often not a simple read or write operation. Therefore, a simulated memory array is insufficient to simulate the memory mapped target hardware and provide a suitable testing environment.

Still another method for dealing with memory access exceptions in host simulation testing is to catch the memory access exception that results from a hardware dependant memory access and redirect the memory access instructions to the hardware simulator component of the host simulation environment. Once the hardware simulator receives a memory access instruction, it calls the appropriate hardware simulator function to process the memory access instruction. Once the hardware simulator has performed its operation, the host simulation process may be resumed. This method is often referred to as implicit memory access (IMA).

Although implicit memory access provides a means to test hardware dependant software, there are numerous limitations with implicit memory access systems as well. First, it may not be possible with an implicit memory access system to change the attributes of a memory access instruction. For example, Linux reserves the address range of 0xC000_0000 to 0xFFFF_FFFF for use by the kernel. As a result, an instruction seeking to access a memory storage location within that address range will produce a second memory access exception. Second, memory access systems cannot handle multiple threads at once. For example, the smallest memory page size in both the Linux and Windows operating systems is 4,000 bytes. Therefore, if multiple threads seek to access memory storage locations having addresses that lie within the same memory page, a change in the attributes of the memory access instruction for one thread will interfere with the operation of the other threads. Third, any changes to the memory access instruction attributes by an implicit memory access system must be reverted, although this problem may be mitigated by various methods, such as using a flag to halt execution of the host simulation environment, wherein the changes may be reverted. However, some operating systems and software debuggers used for performing host simulation do not allow particular flags to be used. Visual Studio debugger for example, reserves use of the processor Trap flag for setting breakpoints and its use by other applications interferes with the debugger. As a result, employing a method involving a flag to revert any changes made to the memory access instructions attributes is not always possible.

BRIEF DESCRIPTION OF THE DRAWINGS

The present invention will be described by way of illustrative embodiments shown in the accompanying drawings in which like references denote similar elements, and in which:

FIG. 6 illustrates a method that may be employed to practice various implementations of the present invention.

FIG. 7 illustrates a method that may be employed to practice various implementations of the present invention.

FIG. 8 illustrates an executable scratch memory array.

FIG. 10 illustrates a method that may be employed to practice various implementations of the present invention.

DETAILED DESCRIPTION OF ILLUSTRATIVE EMBODIMENTS

Host Simulation

Figure 1:
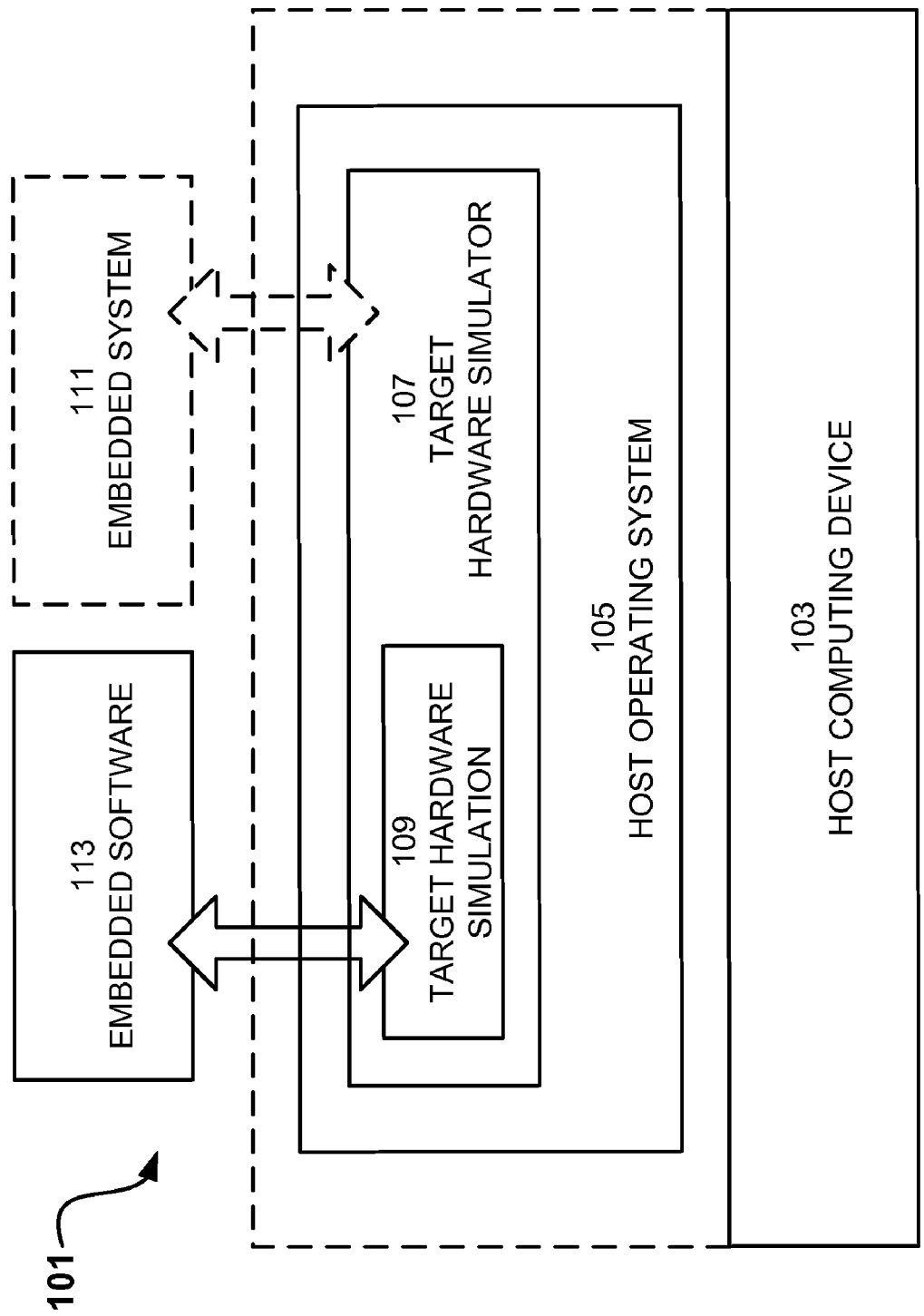
FIG. 1 illustrates a host simulation environment.

As introduced above, host simulation is the process of simulating a hardware device using software and employing the simulated version of the hardware device to test the firmware designed to run on the hardware device. The hardware device is often referred to as the embedded system or the target. FIG. 1 illustrates a host simulation environment 101. As can be seen in FIG. 1, the host simulation environment 101 includes a host computing device 103. A host operating system 105 runs on the host computing device 103. A target hardware simulator 107 may be run with the host operating system 105. In various implementations of the invention, the target hardware simulator 107 is included with the host operating system 105. As can be seen in FIG. 1, the target hardware simulator 107 is capable of instantiating a target hardware simulation 109 of an embedded system 111. With various implementations of the invention, the target hardware simulator 107 may be an independent program executed upon the host operating system 105. With still various implementations of the invention, the target hardware simulator 107 may be an independent program executed upon a second computing device, which communicates with the host computing device 103 and the host operating system 105. The host operating system 105 is further capable of executing or debugging an embedded software program 113. As can be seen in FIG. 1, the embedded software program 113 interacts with the host operating system 105, the target hardware simulator 107 and the target hardware simulation 109.

In various implementations of the invention, the target hardware simulator 107 may be an electronic design automation (EDA) tool, capable of simulating an embedded system. For example, the EDGE™ SimTest tool available from Mentor Graphics Corporation of Wilsonville, Oreg. may be used as the target hardware simulator 107. In some implementations of the invention, the host operating system 105 may be a Microsoft Windows operating system, such as for example, the Windows XP operating system. In further implementations of the invention, the host operating system 105 may be a Unix based operating system, for example, Solaris™ available from Sun Microsystems of Santa Clara, Calif. With still further implementations of the invention, the host operating system 105 may be a custom designed operating system, which may further include the target hardware simulator 107 and operate upon a general purpose computing system.

As stated above, the target hardware simulator 107 is capable of instantiating a simulated version of the embedded system 111, such as the target hardware simulation 109. In various implementations of the invention, the embedded system 111 is in design form. More particularly, the embedded system 111 may be described by a specification detailing the functioning and/or architecture of the embedded system 111. Various functional description languages exist, such as for example the very high speed integrated circuit hardware description language (VHDL,) which may be employed to describe the embedded system 111. Additionally, functional configurations may be specified, such as the memory configuration and the input and output configuration.

The embedded software 113 can be a simple program for controlling the embedded system 111. For example, the embedded system 111 may be a simple spark timing controller for an automobile, with the embedded software 113 then being the software program that computes the appropriate spark timing based upon specified parameters. The embedded software 113 also may be a complex software program, including both device driver code that interacts with the hardware of the embedded system 111 and user interface code that specifies how a user may interact with the hardware of the embedded system 111. For example, the embedded software 113 may be a real time operating system (RTOS), such as the Nucleus™ operating system available from Mentor Graphics Corporation of Wilsonville, Oreg., or the Android™ operating system available from Google of Mountain View, Calif.

Exemplary Operating Environment

As stated above, various electronic design automation tools or processes may be implemented using computer executable software instructions executed by one or more programmable computing devices. Because these examples of the invention may be implemented using software instructions, the components and operation of a generic programmable computer system on which various embodiments of the invention may be employed is described. Further, because of the complexity of some electronic design automation processes and the large size of many circuit designs, various electronic design automation tools are configured to operate on a computing system capable of simultaneously running multiple processing threads. The components and operation of a computer network 201 having a host or master computer and one or more remote or slave computers therefore will be described with reference to FIG. 2. This operating environment is only one example of a suitable operating environment, however, and is not intended to suggest any limitation as to the scope of use or functionality of the invention.

Figure 2:
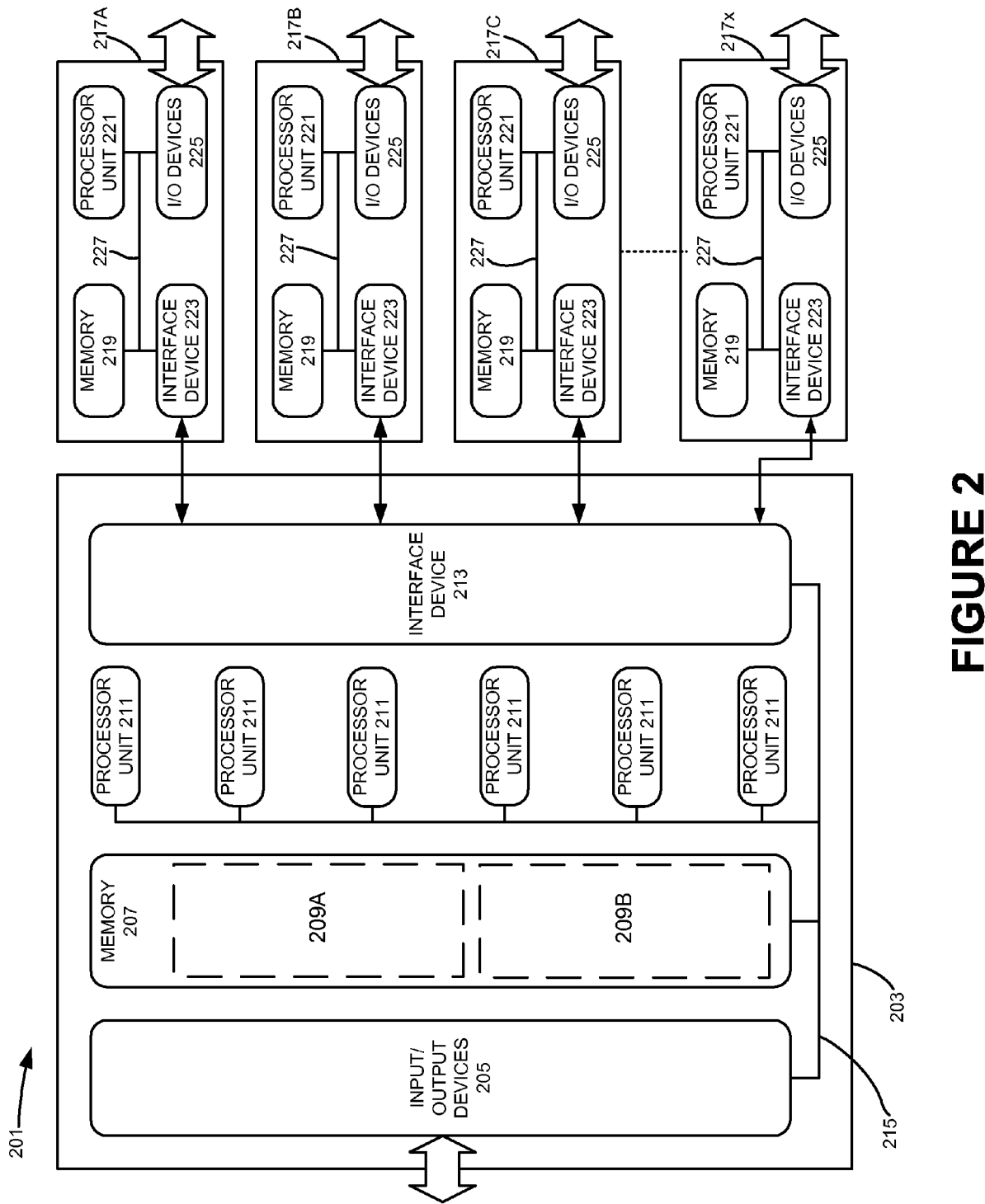
FIG. 2 illustrates an exemplary operating environment with which various implementations of the present invention may tied.

In FIG. 2, the computer network 201 includes a master computer 203. In the illustrated example, the master computer 203 is a multi-processor computer that includes a plurality of input and output devices 205 and a memory 207. The input and output devices 205 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 207 may similarly be implemented using any combination of computer readable media that can be accessed by the master computer 203. The computer readable media may include, for example, microcircuit memory devices such as random access memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 203 runs a software application for performing one or more operations according to various examples of the invention. Accordingly, the memory 207 stores software instructions 209A that, when executed, will implement a software application for performing one or more operations. The memory 207 also stores data 209B to be used with the software application. In the illustrated embodiment, the data 209B contains process data that the software application uses to perform the operations, at least some of which may be parallel.

The master computer 203 also includes a plurality of processor units 211 and an interface device 213. The processor units 211 may be any type of processor device that can be programmed to execute the software instructions 209A, but will conventionally be a microprocessor device. For example, one or more of the processor units 211 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 211 may be a custom manufactured processor, such as a microprocessor designed to optimally perform specific types of mathematical operations. The interface device 213, the processor units 211, the memory 207 and the input/output devices 205 are connected together by a bus 215.

Figure 3:
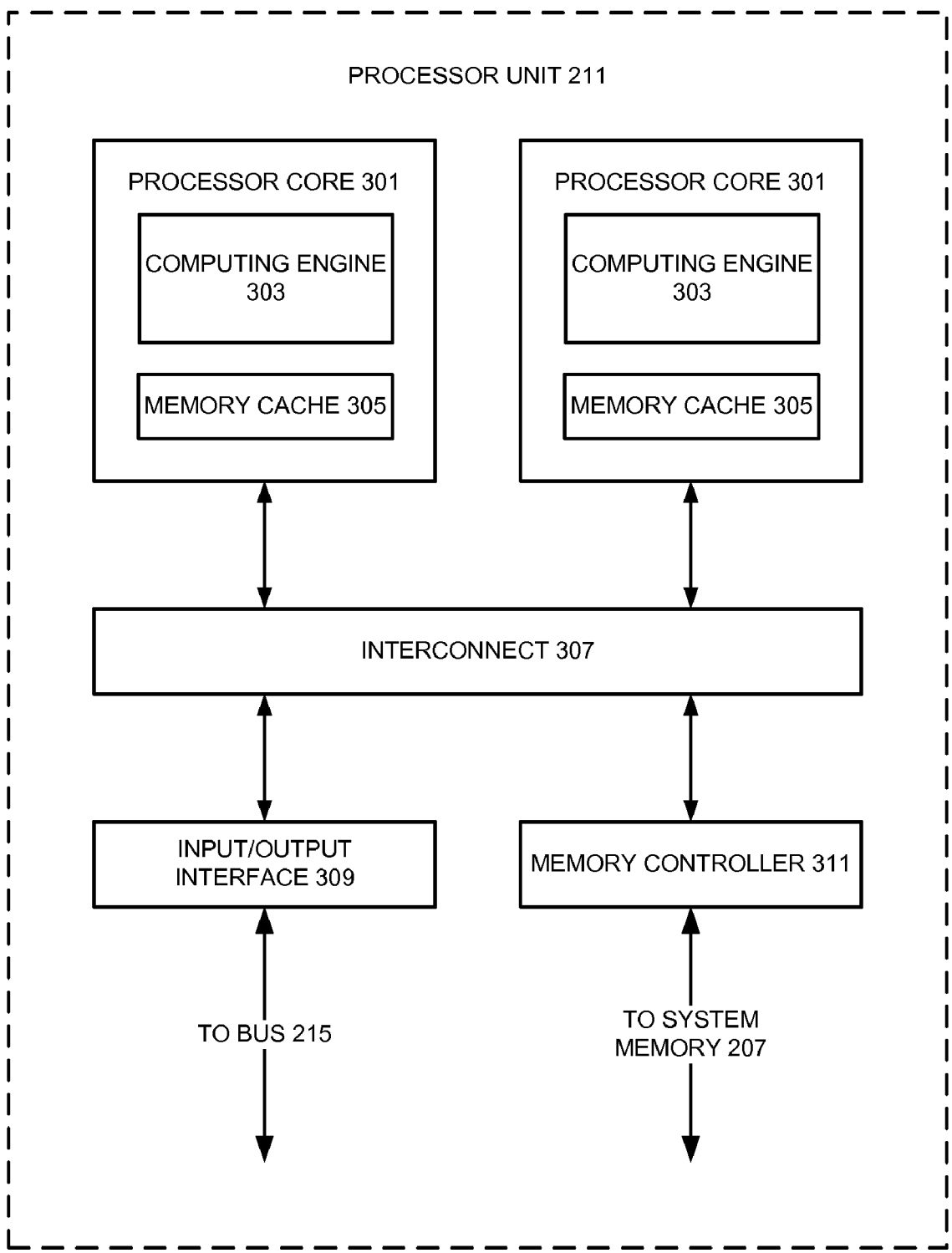
FIG. 3 illustrates an exemplary computing device with which various implementations of the present invention may be tied.

With some implementations of the invention, the master computing device 203 may employ one or more processing units 211 having more than one processor core. Accordingly, FIG. 3 illustrates an example of a multi-core processor unit 211 that may be employed with various embodiments of the invention. As seen in this figure, the processor unit 211 includes a plurality of processor cores 301. Each processor core 301 includes a computing engine 303 and a memory cache 305. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 303 may then use its corresponding memory cache 305 to quickly store and retrieve data and/or instructions for execution.

Each processor core 301 is connected to an interconnect 307. The particular construction of the interconnect 307 may vary depending upon the architecture of the processor unit 301. With some processor cores 301, such as the Cell microprocessor created by Sony Corporation, Toshiba Corporation and IBM Corporation, the interconnect 307 may be implemented as an interconnect bus. With other processor cores 301, however, such as the Opteron™ and Athlon™ dual-core processors available from Advanced Micro Devices of Sunnyvale, Calif., the interconnect 307 may be implemented as a system request interface device. In any case, the processor cores 301 communicate through the interconnect 307 with an input/output interfaces 309 and a memory controller 311. The input/output interface 309 provides a communication interface between the processor unit 211 and the bus 215. Similarly, the memory controller 311 controls the exchange of information between the processor unit 211 and the system memory 207. With some implementations of the invention, the processor units 211 may include additional components, such as a high-level cache memory accessible shared by the processor cores 301.

While FIG. 3 shows one illustration of a processor unit 211 that may be employed by some embodiments of the invention, it should be appreciated that this illustration is representative only, and is not intended to be limiting. For example, some embodiments of the invention may employ a master computer 203 with one or more Cell processors. The Cell processor employs multiple input/output interfaces 309 and multiple memory controllers 311. Also, the Cell processor has nine different processor cores 301 of different types. More particularly, it has six or more synergistic processor elements (SPEs) and a power processor element (PPE). Each synergistic processor element has a vector-type computing engine 203 with 128×128 bit registers, four single-precision floating point computational units, four integer computational units, and a 256 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 211 can be used in lieu of multiple, separate processor units 211. For example, rather than employing six separate processor units 211, an alternate implementation of the invention may employ a single processor unit 211 having six cores, two multi-core processor units 211 each having three cores, a multi-core processor unit 211 with four cores together with two separate single-core processor units 211, or other desired configuration.

Returning now to FIG. 2, the interface device 213 allows the master computer 203 to communicate with the slave computers 217A, 217B, 217C ... 217x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 213 translates data and control signals from the master computer 203 and each of the slave computers 217 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 217 may include a memory 219, a processor unit 221, an interface device 223, and, optionally, one more input/output devices 225 connected together by a system bus 227. As with the master computer 203, the optional input/output devices 225 for the slave computers 217 may include any conventional input or output devices, such as keyboards, pointing devices, microphones, display monitors, speakers, and printers. Similarly, the processor units 221 may be any type of conventional or custom-manufactured programmable processor device. For example, one or more of the processor units 221 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 221 may be custom manufactured processors, such as microprocessors designed to optimally perform specific types of mathematical operations. Still further, one or more of the processor units 221 may have more than one core, as described with reference to FIG. 3 above. For example, with some implementations of the invention, one or more of the processor units 221 may be a Cell processor. The memory 219 then may be implemented using any combination of the computer readable media discussed above. Like the interface device 213, the interface devices 223 allow the slave computers 217 to communicate with the master computer 203 over the communication interface.

In the illustrated example, the master computer 203 is a multi-processor unit computer with multiple processor units 211, while each slave computer 217 has a single processor unit 221. It should be noted, however, that alternate implementations of the invention may employ a master computer having single processor unit 211. Further, one or more of the slave computers 217 may have multiple processor units 221, depending upon their intended use, as previously discussed. Also, while only a single interface device 213 or 223 is illustrated for both the master computer 203 and the slave computers 217, it should be noted that, with alternate embodiments of the invention, either the master computer 203, one or more of the slave computers 217, or some combination of both may use two or more different interface devices 213 or 223 for communicating over multiple communication interfaces.

With various examples of the invention, the master computer 203 may be connected to one or more external data storage devices. These external data storage devices may be implemented using any combination of computer readable media that can be accessed by the master computer 203. The computer readable media may include, for example, microcircuit memory devices such as random access memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the slave computers 217 may alternately or additions be connected to one or more external data storage devices. Typically, these external data storage devices will include data storage devices that also are connected to the master computer 203, but they also may be different from any data storage devices accessible by the master computer 203.

It also should be appreciated that the description of the computer network illustrated in FIG. 2 and FIG. 3 is provided as an example only and is not intended to suggest any limitation as to the scope of use or functionality of alternate embodiments of the invention.

Direct Register Access

As stated above, software designed to be operated with an embedded system may, in the absence of a physical embodiment of the embedded system, still be tested. This is often referred to as host simulation. More particularly, as illustrated by FIG. 1, the target hardware simulation 109 may be instantiated by the target hardware simulator 107 and employed to test the embedded software 113. This process enables the testing of the embedded software 113, even in the absence of a physical embodiment of the embedded system 111. However, as further described above, the embedded software 113 often contain portions referred to as device driver code. The device driver code typically seeks to interact directly with specific areas of the embedded system 111, such as for example a memory storage location having a specific address. Direct register access provides direct access by the device driver code of the embedded software 113 to the memory locations of a simulated instance of the embedded system 111.

Figure 4:
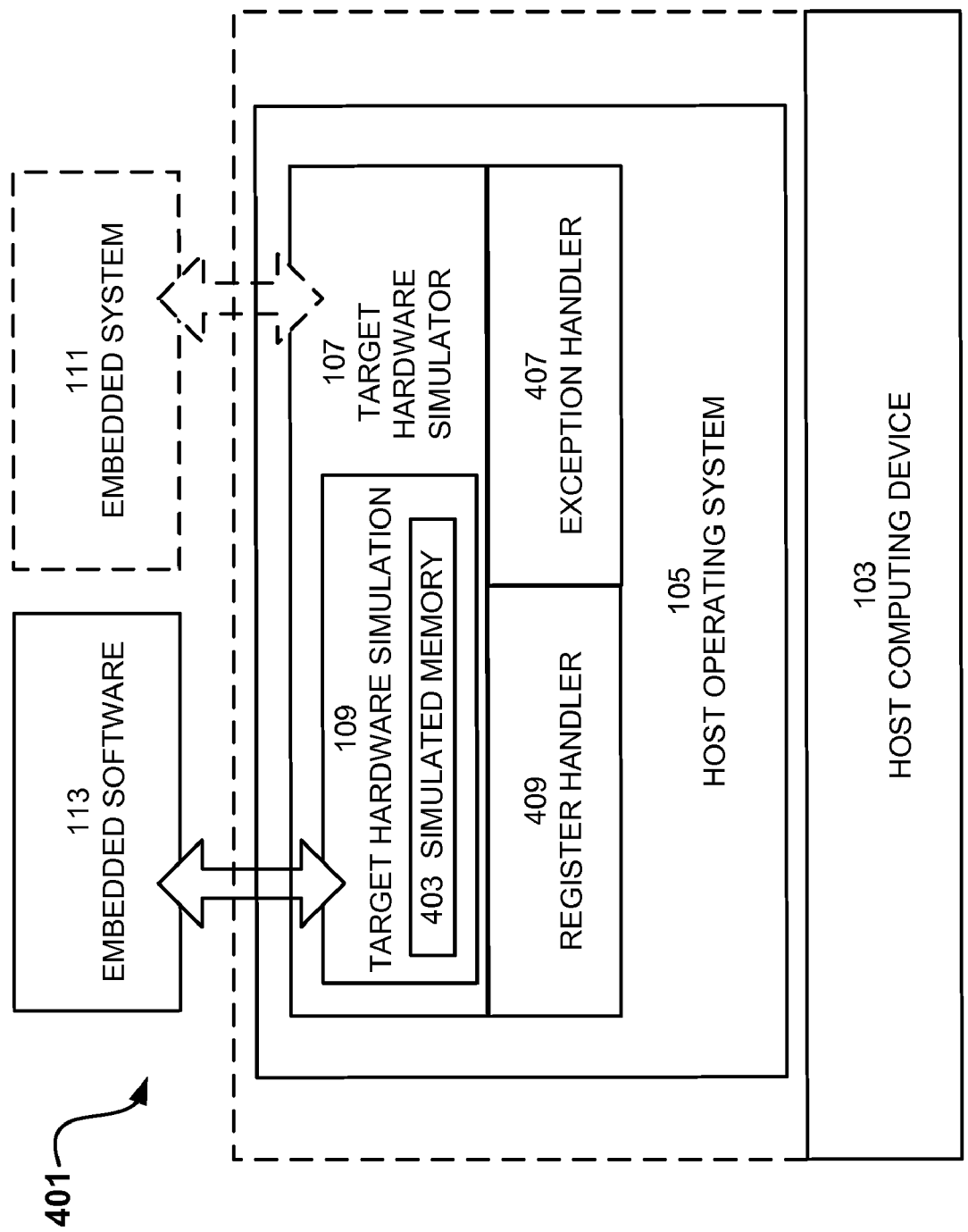
FIG. 4 illustrates a host simulation environment that may be implemented according to various embodiments of the present invention.

FIG. 4 illustrates a host simulation environment 401 that may be implemented according to various embodiments of the present invention. The host simulation environment 401, similar to the host simulation environment 101 is operated upon a computing device 103 and includes a host operating system 105. Additionally, a target hardware simulator 107, which may be operated upon the host operating system 105, is included. As can be seen from FIG. 4, the target hardware simulator 107 is capable of instantiating a target hardware simulation 109. Additionally, in various implementations, the target hardware simulator 107 instantiates a simulated memory 403. In various implementations, the simulated memory 403 corresponds to the memory storage locations available within the embedded system 111. The host simulation environment 401 further includes a register handler 405 and an exception handler 407.

As stated above, many embedded systems have custom or specific memory storage locations or registers for storing data. Additionally, many microprocessors employed in embedded systems have specific addressing requirements for accessing these registers. If the embedded software 113 seeks to access a memory storage location by an address that the host operating system 105 has not previously allocated or initialized, then a memory access exception will result. Additionally, if the embedded software 113 seeks to access a memory storage location by an addressing convention that is not properly recognized or is recognized as "illegal" by the host operating system 105, then a memory access exception will result.

The memory address referenced by the embedded software 113, which causes the memory access exception, is referred to herein interchangeably as an invalid memory address, illegal memory address, or faulty instruction. Additionally, as used herein, any memory access exception caused by an instruction within the embedded software 113 is referred to as a memory access exception or an illegal memory access interchangeably. Additionally still, the instruction within the embedded software 113 that causes the memory access exception will hereafter be referred to as the faulty instruction. Furthermore, occasionally the distinction between the types of memory access exceptions, such as a read memory access exception or a write memory access exception will be made. However, this is not always the case and the methods and processes described herein are equally applicable to any memory access exception in a host simulation environment.

Figure 5:
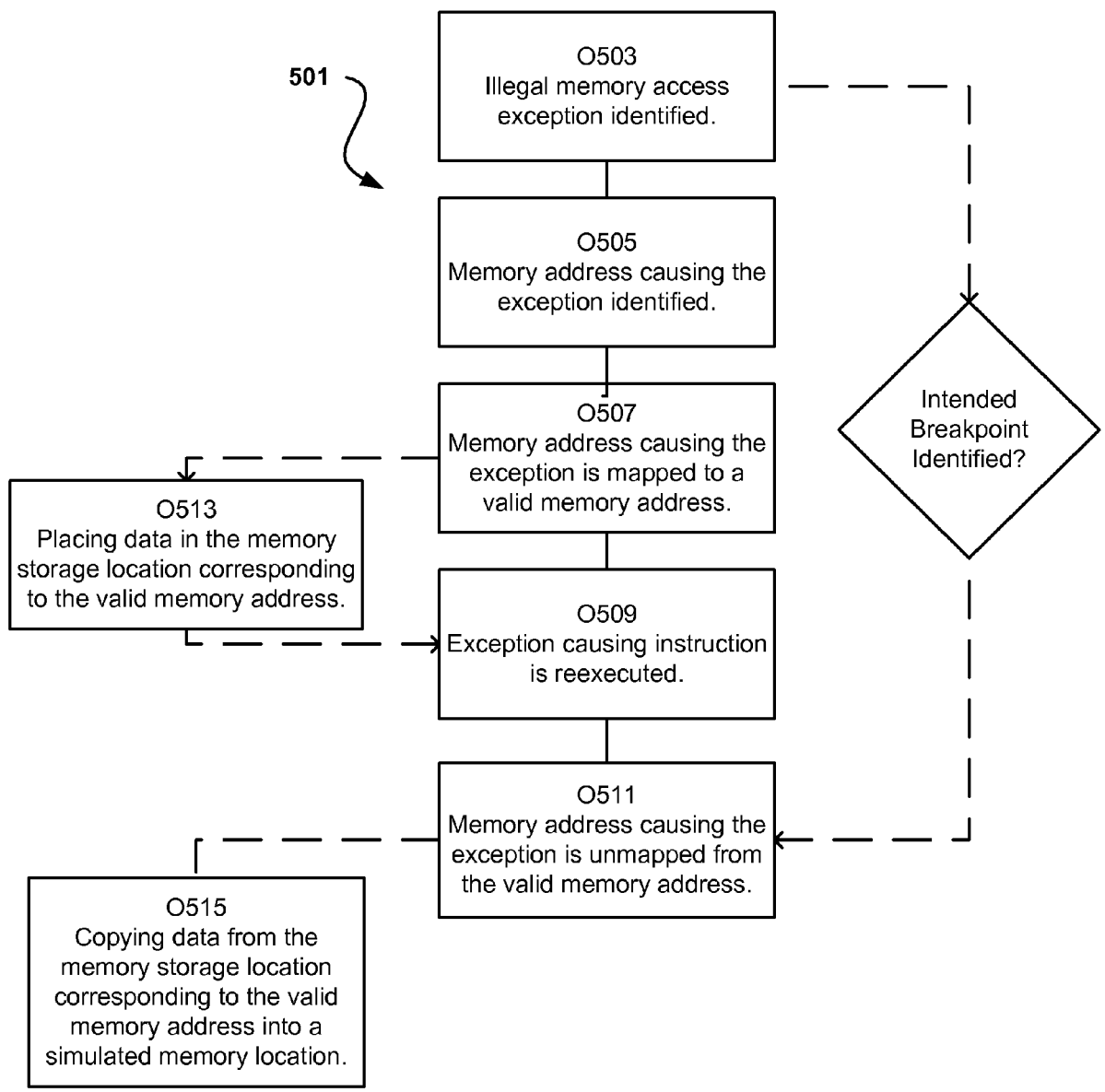
FIG. 5 illustrates a method that may be employed to practice various implementations of the present invention.

FIG. 5 illustrates a method 501 that may be implemented according to various embodiments of the present invention. The method 501 may be implemented to perform direct register access in a host simulation environment, such as for example the host simulation environment 401 of FIG. 4. As can be seen in FIG. 5, the method 501 includes an operation 503 for identifying an illegal memory access exception and an operation 505 for identifying the memory address referenced by the memory access exception. In various implementations of the invention, the operation 503 and the operation 505 are performed simultaneously. For example, a memory access exception may be reported by the host operating system 105 that identifies the exception and further identifies the address of the memory access exception.

The method 501 for performing direct memory access further includes an operation 507 for "mapping" the memory address causing the memory access exception to a valid memory address. After which the instruction within the embedded software 113 that caused the memory access exception is again executed. Furthermore, as can be seen in FIG. 5, the memory address that caused the memory access exception is then "unmapped" from the valid memory address by the operation 511. In various implementations of the invention, the operation 507 replaces the faulty address in the faulty instruction with a valid memory address. For example, the valid memory address may reference a temporary variable. With some implementations of the invention, the exception handler 407 determines the faulty memory address and the faulty memory instruction. More particularly, the exception handler 407 may perform the operation 503 and the operation 505, by for example, "catching" or identifying the memory access exception and the invalid memory address.

As stated, the operation 503 may identify a memory access exception caused by the embedded software 113 seeking to read from an invalid memory address. With some implementations of the invention, the method 501 further includes an operation 513 for placing data in the memory storage location referenced by the valid memory address, hereafter referred to as the valid memory location. In various implementations of the invention, the operation 513 copies data from the simulated memory 403 to the valid memory location. For example, data stored in the memory storage location within the simulated memory 403 that corresponds to the faulty address may be copied or transferred into the valid memory location. The operation 513 may be performed if for example, the faulty instruction is a read instruction. In various implementations of the invention, the register handler 405 may be employed to perform the operation 513.

As further stated above, the operation 503 may identify a memory access exception caused by the embedded software 113 seeking to write to an invalid memory address. Accordingly, with various implementations of the invention, the method 501 further includes an operation 515 for copying or transferring data from the valid memory location into a memory location within the simulated memory 413. For example, data stored in the valid memory location may be copied or transferred to the memory storage location within the simulated memory 413 that corresponds to the faulty address. The operation 515 may be performed if for example, the faulty instruction is a write instruction. In various implementations of the invention, the register handler 409 may be employed to perform the operation 515.

Breakpoint And Soft-Breakpoint Usage in Direct Register Access

As can be seen in FIG. 5, it is desirable that the operation 511 undo any changes to the faulty instruction. For example, if the faulty address in the faulty instruction was replaced with a valid memory address, the valid memory address should subsequently be replaced with the faulty address. More particularly, if a valid memory address is left in the faulty instruction, when the faulty instruction is again executed by the embedded software 113, no memory access exception would result. This would create a ripple effect causing the host simulation system 401 to not correctly implement the implicit memory access system and the embedded software 113 would not be correctly tested.

FIG. 6 illustrates a method 601 for performing direct memory access, which may be implemented according to various embodiments of the present invention. The method 601 may be employed to practice the operation 507 of FIG. 5. As can be seen in FIG. 6, the method 601 includes an operation 603 for replacing the faulty address with a valid memory address. The method 601 additionally includes an operation 605 for inserting a breakpoint instruction after the faulty instruction. In various implementations of the invention, the operation 605 inserts the breakpoint instruction into the instruction queue, sometimes referred to as the instruction buffer or the instruction pipeline, for the embedded system under test. With other implementations of the invention, the operation 605 replaces the instruction following the faulty instruction with the breakpoint instruction.

In various implementations of the invention, the breakpoint instruction is a memory write instruction. The breakpoint instruction seeking to write a known value to a known invalid memory address. For example, the breakpoint instruction could write a known byte of data to the memory address 0xFFFF_FFFF, which would result in a memory access exception. In other implementations the breakpoint instruction sets the TRAP flag, often referred to as the interrupt flag. In various implementations of the invention, the exception handler 407 may be programmed to identify the memory access exception generated from writing the known value to the known invalid memory address as the intended breakpoint. In further implementations of the invention, the exception handler 407 may be programmed to identify the setting of the TRAP flag as the intended breakpoint.

With various implementations of the invention, the operation 509 of FIG. 5 resumes execution of the embedded software program 411. Accordingly, after the faulty instruction is executed, the breakpoint instruction will be executed, generating an additional memory access exception. However, this memory access exception may be recognized by the exception handler 407 as the intended breakpoint and the operation 511 may be performed as illustrated in FIG. 5. FIG. 7 illustrates a method 701 that may be implemented in various embodiments of the present invention to perform the operation 511. As can be seen in FIG. 7, the method 701 includes an operation 703 for removing the breakpoint instruction and an operation 705 for replacing the valid memory address in the faulty instruction with the faulty address.

Temporary Variable and Executable Scratch Memory Usage in Direct Register Access As stated above, a memory access exception typically results from a computer program instruction seeking to access an invalid memory location, such as a memory location that has not previously been allocated. As further stated above, the operation 507 may replaces the faulty address in the faulty instruction with a valid memory address. Many embedded software programs may execute multiple instructions at once, often referred to as multi-threaded applications. More particularly, the faulty instruction, with the replaced memory address, may be simultaneously executed by multiple processing threads of the embedded software program 411.

FIG. 8 illustrates an executable scratch memory array 801 that may be implemented according to various embodiments of the present invention to perform direct memory access on a multi-threaded embedded software program. As can be seen in FIG. 8, the executable scratch memory array 801 may be partitioned or divided into separate executable memory locations 803. In various implementations of the invention, the executable memory locations 803 have a size of 32 bytes. With other implementations of the invention, the executable memory locations 803 have a size of 64 bytes. Still, with other implementations of the invention, the executable memory locations 803 do not have a predetermined size. Accordingly, the executable memory locations may be dynamically sized and allocated.

Figure 9:
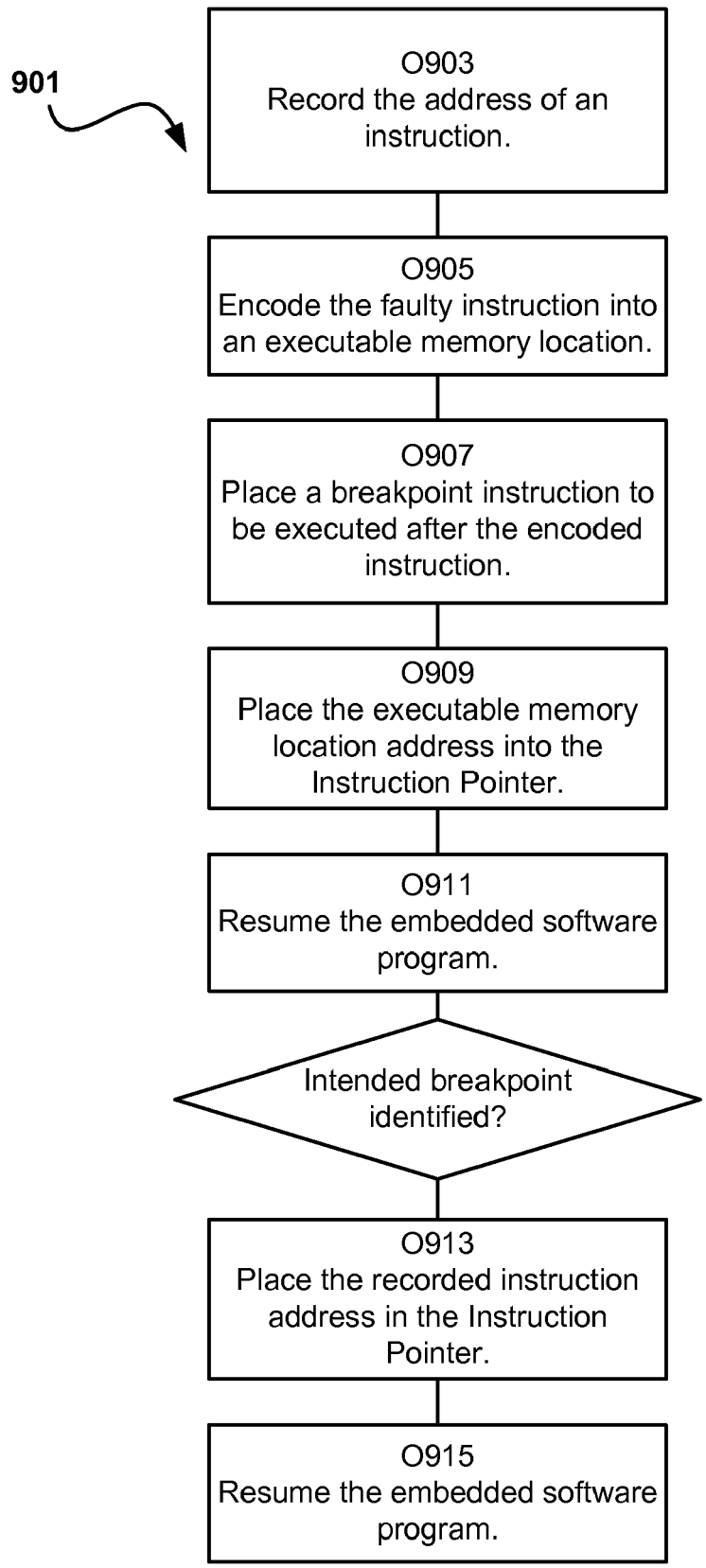
FIG. 9 illustrates a method that may be employed to practice various implementations of the present invention.

FIG. 9 illustrates a method 901 that may be implemented according to various embodiments of the present invention to perform direct memory access using the executable scratch memory array 801. As can be seen in FIG. 9, the method 901 includes an operation 903 for recording the address of an instruction. In various implementations of the invention, the recorded instruction is the instruction following the faulty instruction. The method 901 additionally, includes an operation 905 for encoding the faulty instruction into an executable memory location. For example, one of the executable memory locations 803 of FIG. 8. Furthermore, the method 901 includes an operation 907 for placing a breakpoint instruction to be executed after the encoded instruction. With various implementations of the invention the operation 907 employs a method similar to that illustrated in FIGS. 5 and 6, for causing a breakpoint instruction to be executed after the faulty instruction. The method 901 additionally includes an operation 909 for placing the executable memory location address into the instruction pointer and an operation 911 for resuming execution of the embedded software program. In various implementations of the invention, the operation 911 causes the embedded software program to begin execution from the faulty instruction. As mentioned above, the instruction pointer is often also referred to as the program counter and typically indicates the mechanism with which the computing device maintains its instructions to be executed queue.

The method 901 further includes an operation 913 for placing the recorded instruction address in the instruction pointer and for resuming execution of the embedded software program from the instruction pointer. As can be seen in FIG. 9, the operation 913 and the operation 915 are performed after the intended breakpoint is identified. In various implementations of the invention, the intended breakpoint functions similarly to that as described in reference to FIG. 5, FIG. 6, and FIG. 7.

String Processing In Direct Register Access Systems

Instructions that process strings typically will have a component that increments the memory address in order to accommodate the string data type. This is especially true for those embedded software programs written in assembly language. Accordingly, a string instruction containing a faulty memory address, when replaced with a valid memory address will increment the valid memory address as the instruction is executed. FIG. 10 illustrates a method 1001 that may be implemented according to various implementations of the present invention to handle string processing instructions in a direct memory access environment.

As can be seen in FIG. 10, the method 1001 includes an operation 1003 for recording a count register value, an operation 1005 for setting the count register value equal to 1, an operation 1007 for processing the instruction, and an operation 1009 for decrementing the count register value. In various implementations of the invention, the count register is the computations processing unit's iteration register. As can be seen in FIG. 10, the operations 1005, 1007, and 1009 may be repeated a number of times. For example, if the recorded counter register value is initially nine (9), then the process may be repeated nine (9) times. In various implementations of the invention, the operation 1007 employs a method such as the method 501 of FIG. 5 to perform direct memory access.

Conclusion

As stated above, software designed to be operated with an embedded system may, in the absence of a physical embodiment of the embedded system, still be tested. A simulation of the embedded system may be employed to operate the software. Additionally, methods for processing requests by the software to access memory within the embedded system are provided.

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A method of handling a memory access exception in a host simulation environment, comprising:
   identifying a memory access exception, the memory access exception corresponding to a first memory address and a first instruction;
   mapping the first memory address to a second memory address;
   identifying an iteration register, the iteration register storing a first value;
   storing the first value in a memory storage location;
   altering the value stored in the iteration register;
   setting a breakpoint to occur after the first instruction has executed;
   resuming execution of the first instruction;
   stopping at the breakpoint;
   adjusting the first value; and
   setting the value stored in the iteration register to the adjusted first value.

2. The method recited in claim 1, further comprising:
   identifying a set of memory access parameters, the set of memory access parameters comprising an instruction location; and
   unmapping the first memory address from the second memory address.

3. The method recited in claim 2, wherein unmapping the first memory address from the second memory address comprises replacing the second memory address in the first instruction with the first memory address.

4. The method recited in claim 3, further comprising allocating a temporary variable, the temporary variable being allocated at the second memory address.

5. The method recited in claim 4, wherein the temporary variable is a variable selected from an array of temporary variables.

6. The method recited in claim 5, wherein the array of temporary variables is an array of temporary variables selected from a plurality of arrays of temporary variables.

7. The method recited in claim 1, wherein setting a breakpoint to occur after the first instruction has executed comprises:
   inserting a second instruction after the first instruction, the second instruction including operations for:
      writing a single byte to a known illegal memory location, wherein a second memory access exception is caused; and
      identifying the second memory access exception as the breakpoint.

8. The method recited in claim 7, further comprising:
   storing the second instruction to a scratch memory storage location; and
   causing the second instruction to be executed from the scratch memory storage location.

9. The method recited in claim 7, further comprising:
   storing the first instruction to a first scratch memory storage location;
   storing the second instruction to second scratch memory storage location;
   causing the first instruction to be executed from the first scratch memory storage location; and
   causing the second instruction to be executed from the second scratch memory storage location.

10. The method recited in claim 3, wherein unmapping the first memory address to the second memory address further comprises copying at least a portion of data from a memory storage location corresponding to the second memory address into a memory storage location corresponding to the first memory address.

11. The method recited in claim 1, wherein mapping the first memory address to a second memory address comprises replacing the first memory address in the first instruction with the second memory address.

12. The method recited in claim 11, mapping the first memory address to a second memory address further comprising copying at least a portion of data into a memory storage location corresponding to the second memory address.

13. The method recited in claim 1, wherein identifying a memory access exception comprises decoding the first instruction, the decoded first instruction including the first memory address.

14. A computer program product for enabling a computer to process a memory access exception in a host simulation environment comprising:
  software instruction for enabling the computer to perform a set of operations; and
  one or more computer readable medium storing the software instructions;
  the operations including:
    identifying a memory access exception, the memory access exception corresponding to a first memory address and a first instruction,
    mapping the first memory address to a second memory address,
    identifying an iteration register, the iteration register storing a first value,
    storing the first value in a memory storage location,
    altering the value stored in the iteration register,
    setting a breakpoint to occur after the first instruction has executed,
    resuming execution of the first instruction, whereby the computer processes the memory access exception,
    stopping at the breakpoint;
    adjusting the first value, and
    setting the value stored in the iteration register to the adjusted first value.

15. The computer program product recited in claim 14, wherein the operation for mapping the first memory address to a second memory address comprises replacing the first memory address in the first instruction with the second memory address.

16. The computer program product recited in claim 15, wherein the operation for mapping the first memory address to a second memory address further comprises copying at least a portion of data into a memory storage location corresponding to the second memory address.

17. The computer program product recited in claim 14, wherein the set of operations further comprise:
  identifying a set of memory access parameters, the set of memory access parameters comprising an instruction location;
  causing a breakpoint to occur after the instruction location; and
  unmapping the first memory address from the second memory address.

18. The computer program product recited in claim 17, wherein the operation for unmapping the first memory address from the second memory address comprises replacing the second memory address in the first instruction with the first memory address.

19. The computer program product recited in claim 17, wherein the operation for unmapping the first memory address from the second memory address further comprising copying at least a portion of data from a memory storage location corresponding to the second memory address into a memory storage location corresponding to the first memory address.

20. The computer program product recited in claim 17, wherein the operation for causing a breakpoint to occur after the instruction location comprises:
  inserting a second instruction after the instruction location, the second instruction including operations for:
    writing a single byte to a known illegal memory location, wherein a second memory access exception is caused; and
    identifying the second memory access exception as the breakpoint.

21. The computer program product recited in claim 20, wherein the set of operations further comprises:
  storing the second instruction to a scratch memory storage location; and
  causing the second instruction to be executed from the scratch memory storage location.

22. The computer program product recited in claim 20, wherein the set of operations further comprises:
  storing the first instruction to a first scratch memory storage location;
  storing the second instruction to a second scratch memory storage location;
  causing the first instruction to be executed from the first scratch memory storage location; and
  causing the second instruction to be executed from the second scratch memory storage location.

23. The computer program product recited in claim 22, wherein:
  the first scratch memory storage location is a select storage location from an array of executable scratch memory storage locations; and
  the second scratch memory storage location is a select storage location from the array of executable scratch memory storage locations.

24. The computer program product recited in claim 21, wherein the scratch memory storage location is a select storage location from an array of executable scratch memory storage locations.

25. The computer program product recited in claim 17, wherein the set of operations further comprises allocating a temporary variable, the temporary variable being allocated at the second memory address.

26. The computer program product recited in claim 25, wherein the temporary variable is a variable selected from an array of temporary variables.

27. The computer program product recited in claim 26, wherein the temporary variables is an array of temporary variables selected from a plurality of arrays of temporary variables.

* * * * *